United States Patent [19]

Marsh et al.

[11] Patent Number: 4,538,086
[45] Date of Patent: Aug. 27, 1985

[54] STATOR FOR AN ELECTROMAGNETIC MACHINE

[75] Inventors: John D. Marsh, Waterloo, Belgium; Craig A. Nazzer, Sydney, Canada

[73] Assignee: Caterpillar Tractor Co., Peoria, Ill.

[21] Appl. No.: 605,954

[22] Filed: Aug. 17, 1984

[30] Foreign Application Priority Data

May 3, 1983 [GB] United Kingdom ............... 8311997

[51] Int. Cl.³ .............................................. H02K 1/12
[52] U.S. Cl. .................................. 310/258; 310/179; 310/218
[58] Field of Search .............................. 310/216–218, 310/268, 254, 258, 259, 156, 114, 179

[56] References Cited

U.S. PATENT DOCUMENTS

| | | | |
|---|---|---|---|
| 2,236,291 | 3/1941 | Kilbourne | 310/218 |
| 2,654,039 | 9/1953 | Abdo | 310/258 |
| 3,700,943 | 10/1972 | Heintz et al. | 310/168 |
| 4,237,396 | 12/1980 | Blenkinsop et al. | 310/154 |

FOREIGN PATENT DOCUMENTS

| | | | |
|---|---|---|---|
| 0184982 | 3/1956 | Austria | 310/268 |
| 0158607 | 12/1979 | Japan | 310/216 |

*Primary Examiner*—R. Skudy
*Attorney, Agent, or Firm*—Stephen L. Noe

[57] ABSTRACT

Electromagnetic machines of the type having circular arrays of permanent magnets arranged on a rotor and a plurality of pole pieces arranged on a stator, requires that a maximum number of pole pieces be arranged around the stator in order to attain maximum utilization of the magnetic flux and to minimize interpole flux leakage. The instant stator of an electromagnetic machine includes a plurality of U-shaped pole pieces, with adjacent ones of the pole pieces opening in opposite radial directions from an axis of the stator. The pole pieces which open radially inwardly are stepped so as to have a relatively thicker portion radially outwardly from the axis and a relatively thinner portion radially inwardly from the axis. Thus, the number of pole pieces that can be arranged around the stator is maximized, as is the utilization of magnetic flux, and interpole flux leakage is minimized.

2 Claims, 3 Drawing Figures

STATOR FOR AN ELECTROMAGNETIC MACHINE

TECHNICAL FIELD

This invention relates generally to electromagnetic machines, and more particularly, to pole pieces for motors having permanent magnet excitation.

BACKGROUND ART

There are, currently available, motors having circular arrays of permanent magnets arranged on a rotor. The rotor is associated with a stator having a plurality of pole pieces energized by a coil carrying a controlled electric current. Commutation of the electric current produces a rotating magnetic field in the stator, and interaction between the pole pieces and the permanent magnets results in rotation of the rotor. One example of such a motor is described in U.S. Pat. Ser. No. 4,237,396, issued to Blenkinsop et al. on Dec. 2, 1980.

In designing motors of this general type, it is important to maintain the mutual inductance of the coil at the lowest possible level in order to obtain maximum utilization of the available magnetic flux, increasing the efficiency of operation and decreasing energy losses. Location and design of the pole pieces is a critical factor in maximizing the utilization of the magnetic flux. It is important that as many pole pieces as possible be arranged around the stator coil. Coincidentally, interpole magnetic flux leakage needs to be kept as low as possible to reduce leakage inductance.

Blenkinsop proposed staggering the arrangement of the pole pieces so that those pole pieces which open radially inwardly are radially further from the central axis of the machine than those pole pieces which open radially outwardly. Such arrangement increases the number of pole pieces which can be incorporated in a stator of given radius and prevents any increase in interpolar flux leakage resulting from the increased number of pole pieces. However, it will be appreciated that the dimensions of the machine are inevitably increased as a result of such staggering and this may be unacceptable in certain circumstances. An alternative proposal put forward in the same patent specification is the shortening of the radially inwardly opening pole pieces, again allowing an increase in the number of pole pieces, without increasing interpolar flux leakage. However, as a result of such shortening, the face area of the pole pieces is reduced, resulting in a reduction in the utilization of magnetic flux.

The present invention is directed to overcoming one or more of the problems as set forth above.

DISCLOSURE OF THE INVENTION

In one aspect of the present invention, a stator of an electromagnetic machine is provided. The stator includes a frame having a central axis and a coil wound on the frame. A plurality of U-shaped pole pieces are mounted on the frame in straddling relationship to the coil, adjacent ones of the pole pieces open in opposite radial directions. The pole pieces which open radially inwardly from the axis of the stator have radially inner and outer portions. The radially inner portion has a cross-sectional area that is less than the radially outer portion cross-sectional area.

The present invention increases the number of pole pieces that can be arranged around the stator while maximizing the face area of the pole pieces. Utilization of the magnetic flux is maximized and interpolar flux leakage is maintained as low as possible.

BRIEF DESCRIPTION OF THE DRAWINGS

For a better understanding of the present invention, reference may be made to the accompanying drawings, in which.

BEST MODE FOR CARRYING OUT THE INVENTION

Figure 1:
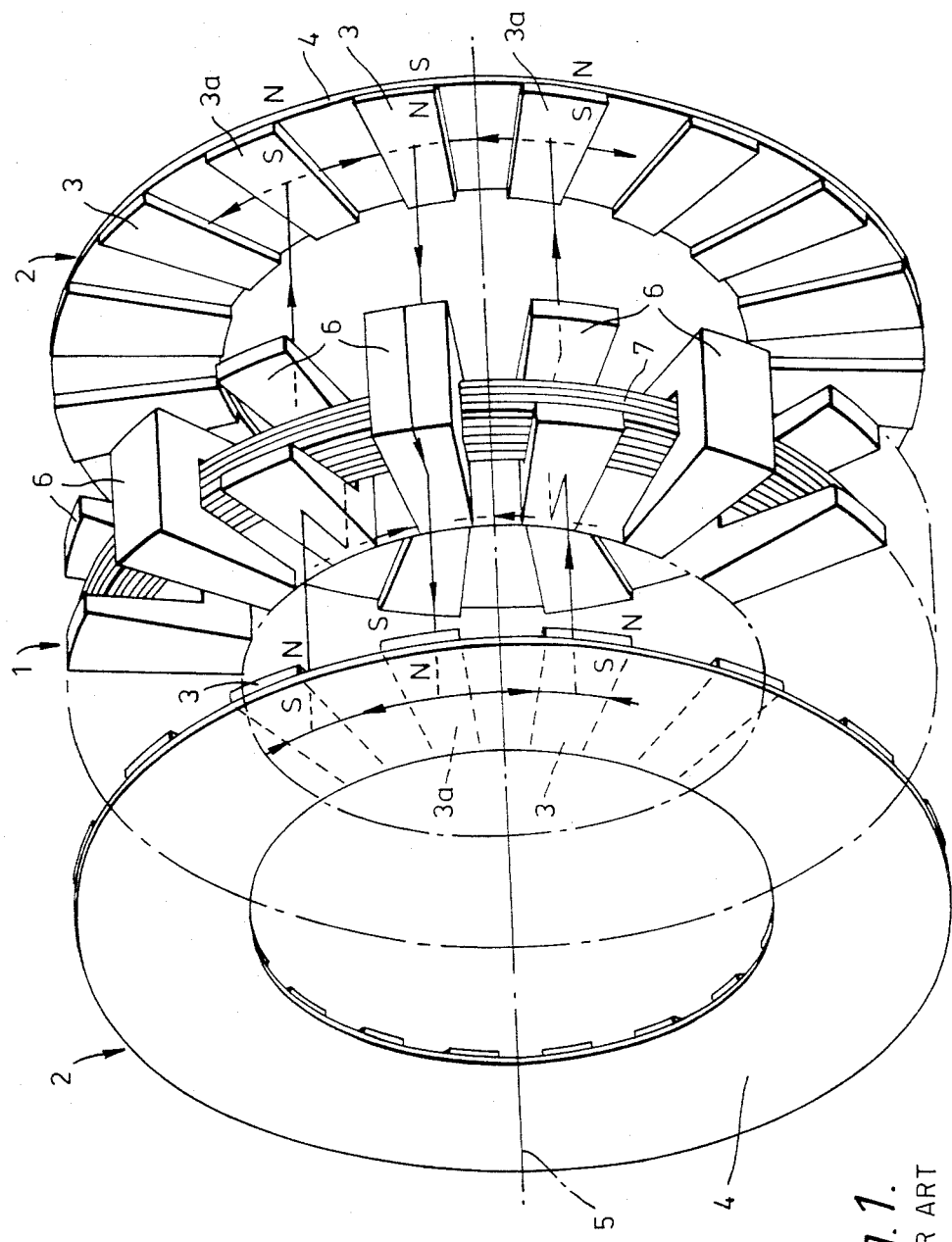
FIG. 1 is a diagramatic view of a prior art device.

FIG. 1 shows, diagrammatically, the basic elements of a typical motor suitable for use with an embodiment of the present invention. The machine has a stator 1 and a pair of rotors 2, each of the rotors 2 has a series or permanent magnets 3,3a, arranged equidistantly around the periphery of the rotor 2 on a magnetically permeable steel annular 4. Alternate ones of the magnets 3,3a, have their north and south poles facing in radially opposite directions. A south pole on one rotor 2 faces a north pole on the other rotor 2 and vice-versa. The rotors 2 and stator 1 are positioned along a common central axis 5, the rotors 2 are fixed on a common shaft (not shown) for rotation relative to the stator 1. The stator 1 has a plurality of U-shaped pole pieces 6 opening alternately radially inwardly and outwardly from the axis 5, and equidistantly arranged around the periphery of the stator 1 at the same spacing as the permanent magnets 3,3a. The pole pieces 6 are mounted on a stator frame, not shown to enhance the clarity of FIG. 1. The pole pieces 6 provide magnetic flux paths between the magnets 3,3a on the two rotors 2, on opposite sides of the stator 1. The alternating arrangement of the pole pieces 6 provides a magnetic flux path alternately inwardly and outwardly of an annular coil 7 which is mounted to the frame and runs through the straddling pole pieces 6. In response to repeatedly changing the direction of current through the coil 7, the rotors 2 rotate about the axis 5 relative to the stator 1.

Figure 2:
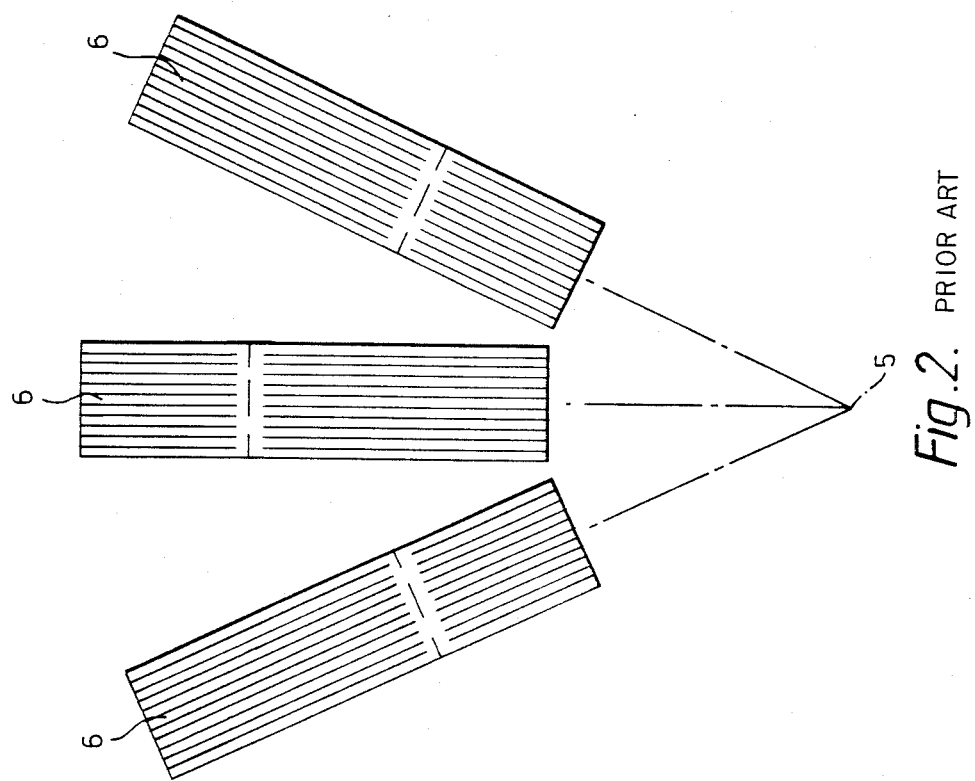
FIG. 2 is an axial end elevation showing a prior arrangement of the pole pieces; and, FIG. 3 is an axial end elevation showing an arrangement of the pole pieces in accordance with an embodiment of the present invention.

Referring to FIG. 2, it will be appreciated that, with pole pieces 6 of equal size and shape, the minimum spacing between the pole pieces 6 is determined by the dimensions of the radially inner portion of the pole pieces 6. This dimension defines the maximum number of pole pieces 6 that can be arranged on a stator 1 of given radius.

Figure 3:
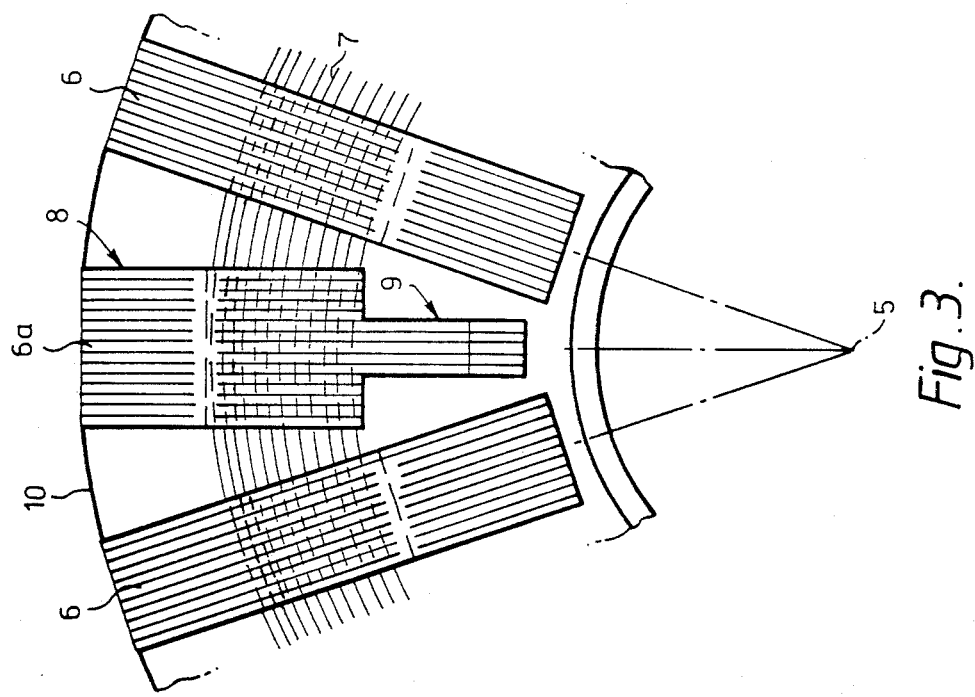

Referring now to FIG. 3, part of a stator arrangement showing a stator frame 10 having a central axis 5 and including an annular coil 7 with alternate pole pieces 6a constructed in accordance with an embodiment of the present invention is shown to the same scale as FIG. 2. The pole pieces 6a opening radially inwardly toward the axis 5 have a radially inner portion 9 and a radially outer portion 8. The radially inner portion 9 has a cross-sectional area less than the radially outer portion 8 cross-sectional area. Preferably, the radially outer portion 8 of the radially inwardly opening pole pieces 6a has a cross-sectional area greater than the cross-sectional area of any portion of the pole pieces 6 opening radially outwardly from the axis 5, and the radially inner portion 9 of the radially inwardly opening pole pieces 6a has a cross-sectional area less than the cross-sectional area of any portion of the pole pieces 6 opening radially outwardly from the axis 5. Each of the pole pieces 6,6a are substantially equal in length and are positioned substantially the same radial distance from the central axis 5 of the stator along a plane perpendicular to the axis 5. Slight foreshortening of the radially inner portion 9 of the radially inwardly opening pole pieces 6a may be advantageous in some cases if it is desired further to reduce leakage inductance, so long as the face area of the pole pieces 6a is not substantially reduced.

INDUSTRIAL APPLICABILITY

The instant invention provides a large face area for the pole pieces 6,6a, thus achieving efficient utilization of the available magnetic flux, while continuing to maintain interpole flux leakage at low levels. Furthermore, it is not necessary either to radially stagger adjacent pole pieces 6a or to substantially radially shorten them.

Other aspects, objects, advantages and uses of this invention can be obtained from a study of the drawings, the disclosure and the appended claims.

We claim:

1. A stator of an electromagnetic machine, comprising:
   a stator frame having a central axis;
   an annular coil wound on said frame;
   a plurality of U-shaped pole pieces mounted on said frame in straddling relationship to said coil and opening radially outwardly from said axis;
   a plurality of U-shaped pole pieces mounted on said frame in straddling relationship to said coil and opening radially inwardly from said axis;
   adjacent ones of said pole pieces opening in opposite radial directions from said axis; and
   said radially inwardly opening pole pieces having a radially inner portion and a radially outer portion, said radially outer portion and a radially inwardly opening pole pieces having a cross-sectional area greater than the cross-sectional area of said radially outwardly opening pole pieces, and said radially inner portion of said radially inwardly opening pole pieces having a cross-sectional area less than the cross-sectional area of said radially outwardly opening pole pieces.

2. A stator of an electromagnetic machine, as set forth in claim 1, wherein said frame has a central axis, and each of said pole pieces is substantially equal in length and is positioned substantially the same radial distance from the central axis of said frame along a plane perpendicular to said axis.

* * * * *

UNITED STATES PATENT AND TRADEMARK OFFICE
CERTIFICATE OF CORRECTION

PATENT NO. : 4,538,086

DATED : August 27, 1985

INVENTOR(S) : John D. Marsh et al.

It is certified that error appears in the above-identified patent and that said Letters Patent is hereby corrected as shown below:

Claim 1, line 15 (column 4, line 13), "and a" should be --of said--.

Signed and Sealed this

Fifteenth Day of April 1986

[SEAL]

Attest:

DONALD J. QUIGG

Attesting Officer

Commissioner of Patents and Trademarks